United States Patent
Bhogal et al.

(10) Patent No.: US 8,320,006 B2
(45) Date of Patent: Nov. 27, 2012

(54) MANAGING DIGITAL IMAGES TO BE PRINTED

(75) Inventors: Kulvir S. Bhogal, Pflugerville, TX (US); Lisa Seacat DeLuca, San Francisco, CA (US); Robert R. Peterson, Austin, TX (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/627,903

(22) Filed: Nov. 30, 2009

(65) Prior Publication Data

US 2011/0128568 A1   Jun. 2, 2011

(51) Int. Cl.
*G06F 3/12* (2006.01)
*H04B 7/00* (2006.01)

(52) U.S. Cl. ............ 358/1.15; 358/1.13; 358/1.14; 455/41.2; 455/41.3; 718/106

(58) Field of Classification Search ........ 358/1.13–1.16; 718/106; 709/223; 455/41.2, 41.3
See application file for complete search history.

(56) References Cited

U.S. PATENT DOCUMENTS

| | | | |
|---|---|---|---|
| 6,646,754 B1 * | 11/2003 | Redd et al. | 358/1.13 |
| 6,812,962 B1 | 11/2004 | Fredlund et al. | |
| 6,909,889 B2 | 6/2005 | Ishikawa | |
| 7,034,871 B2 | 4/2006 | Parulski et al. | |
| 7,305,233 B2 * | 12/2007 | Paul et al. | 455/418 |
| 7,394,372 B2 * | 7/2008 | Gloekler et al. | 340/572.1 |
| 7,528,978 B2 * | 5/2009 | Randt | 358/1.15 |
| 7,626,717 B2 * | 12/2009 | Rai et al. | 358/1.15 |
| 7,808,662 B2 * | 10/2010 | Yamada | 358/1.14 |
| 7,970,854 B2 * | 6/2011 | Svendsen et al. | 709/217 |
| 8,023,889 B2 * | 9/2011 | Appleyard et al. | 455/41.1 |
| 8,120,801 B2 * | 2/2012 | Zhang et al. | 358/1.15 |
| 2005/0054290 A1 * | 3/2005 | Logan et al. | 455/41.2 |
| 2006/0176503 A1 | 8/2006 | Brownstein | |
| 2008/0144078 A1 | 6/2008 | Callo et al. | |
| 2009/0323098 A1 * | 12/2009 | Gao | 358/1.15 |

* cited by examiner

*Primary Examiner* — Twyler Haskins
*Assistant Examiner* — Dennis Dicker
(74) *Attorney, Agent, or Firm* — Patterson & Sheridan, LLP (57) ABSTRACT

Systems, methods and articles of manufacture are disclosed for managing digital images to be shared with and/or printed for a user. In one embodiment, the digital images may be received for the user. That a count of the digital images exceeds a threshold count may be determined. The digital images may be transmitted to a location where they may be printed for the user. The user may be notified when the printed images are ready to be picked up by the user.

21 Claims, 5 Drawing Sheets

FIG. 5

MANAGING DIGITAL IMAGES TO BE PRINTED

BACKGROUND

1. Field of the Invention

Embodiments of the invention relate to digital images. More specifically, embodiments of the invention relate to techniques for managing digital images to be printed for a user.

2. Description of the Related Art

Today, users can share digital images in various ways. For example, many services allow a user to upload digital images to a website and share the digital images with other users via the website. Some of these services also offer a printing option. The user may submit the digital images to be printed. The user may also specify a pickup location (e.g., a local retail store). The user may subsequently pick up the printed digital images at the specified pickup location.

Often, other users may share digital images with the user. For example, person B may share five digital images with person A in a given week. Further, person C may share six digital images with person A in the given week. Person A may make multiple visits to the local retail store to pick up printed digital images. Specifically, person A may visit the local retail store to pick up printed digital images received from person B. Person A may visit the local retail store again to pick up printed digital images received from person C. Making multiple trips to pick up printed digital images may be inconvenient for person A.

SUMMARY

One embodiment of the invention includes a computer-implemented method. The method may generally include configuring one or more computer processors to perform an operation. The operation may generally include storing digital images in a print queue associated with a first user; receiving, from a second user, a first digital image to share with the first user; adding the first digital image to the print queue associated with the first user; determining that the digital images in the print queue satisfy printing criteria; and transmitting the digital images to be printed.

Another embodiment of the invention includes a computer-readable storage medium containing a program, which, when executed on a processor, performs an operation. The operation may generally include storing digital images in a print queue associated with a first user; receiving, from a second user, a first digital image to share with the first user; adding the first digital image to the print queue associated with the first user; determining that the digital images in the print queue satisfy printing criteria; and transmitting the digital images to be printed.

Still another embodiment includes a system having one or more computer processors and a memory containing a program, which when executed by the one or more computer processors is configured to perform an operation. The operation may generally include storing digital images in a print queue associated with a first user; receiving, from a second user, a first digital image to share with the first user; adding the first digital image to the print queue associated with the first user; determining that the digital images in the print queue satisfy printing criteria; and transmitting the digital images to be printed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for managing digital images to be printed for a user. One embodiment of the invention provides an application such as a web-based application for managing digital images. For example, users may share and print digital images using the application. In one embodiment, the application may receive digital images to be shared with and/or printed for the user. The application may determine that a count of the received digital images exceeds a threshold count. The application may transmit the digital images to a printing location to be printed for the user. The application may also notify the user that the digital images are ready to be picked up by the user. For example, person A may set a threshold count of one hundred digital images. Upon receiving one hundred digital images for person A, the application transmits the one hundred digital images to be printed for person A. The application notifies person A that one hundred digital images are ready to be picked up.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
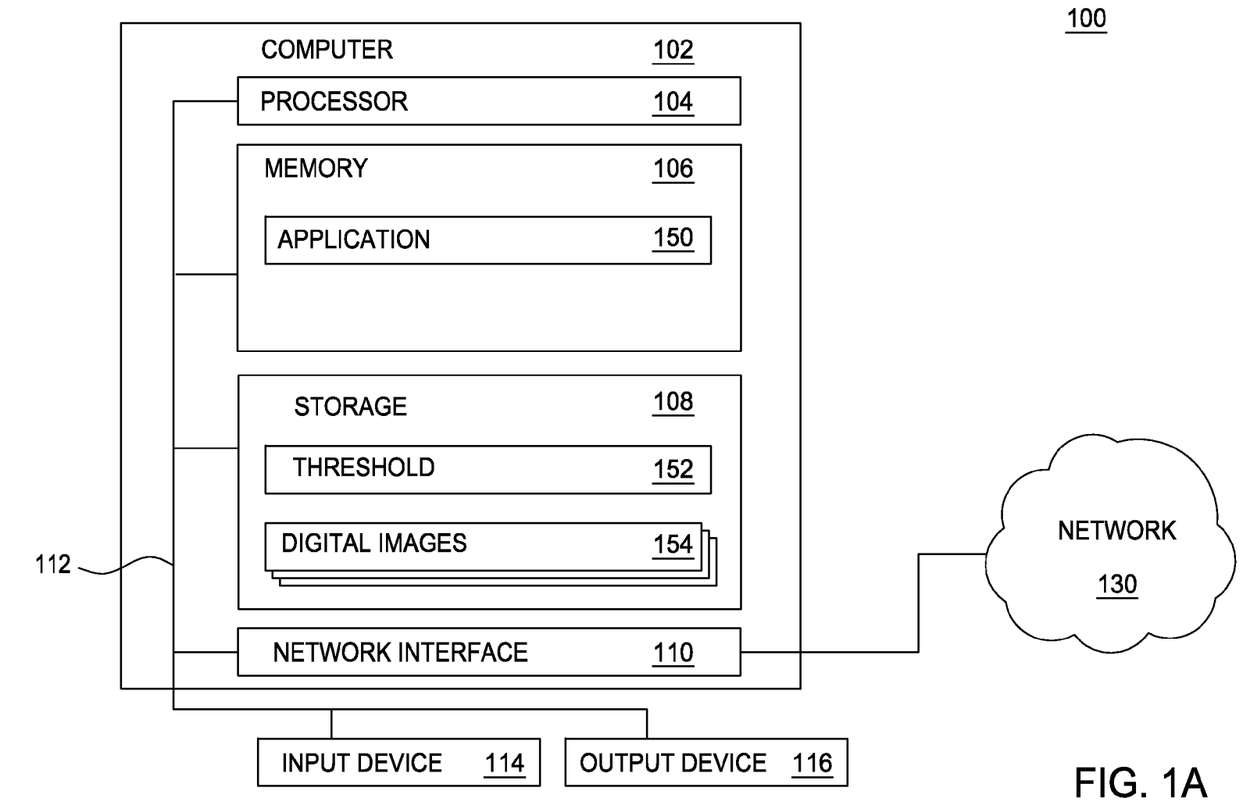
FIGS. 1A-1B are block diagrams illustrating a system for managing digital images to be printed, according to one embodiment of the invention.

FIG. 1A is a block diagram illustrating a system 100 for managing digital images to be printed, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, or the like may be used. The output device 116 may be any device for providing output to a user of the computer 102. For example, the output device 116 may be any conventional display screen or set of speakers, along with their respective interface cards, i.e., video cards and sound cards. Although shown separately, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 and storage 108 includes a threshold 152 and digital images 154. In one embodiment, the application 150 may be a web application for managing the digital images 154. For example, a user may upload the digital images 154 to the computer 102. The user may specify to print and/or share (with another user) the uploaded digital images 154. In one embodiment, the user may also specify a threshold 152 for printing the digital images 154. If the threshold 152 is set, the application 150 may withhold transmitting the digital images 154 for printing until a count of the digital images 154 to be printed reaches the threshold 152. The threshold 152 may be user-specific. That is, different users of the application 150 may set different thresholds for printing the digital images 154. Of course, those skilled in the art will recognize that printing criteria other than a threshold count of images may be specified to guide how the application 150 determines when to transmit the digital images 154 for printing.

Figure 1B:
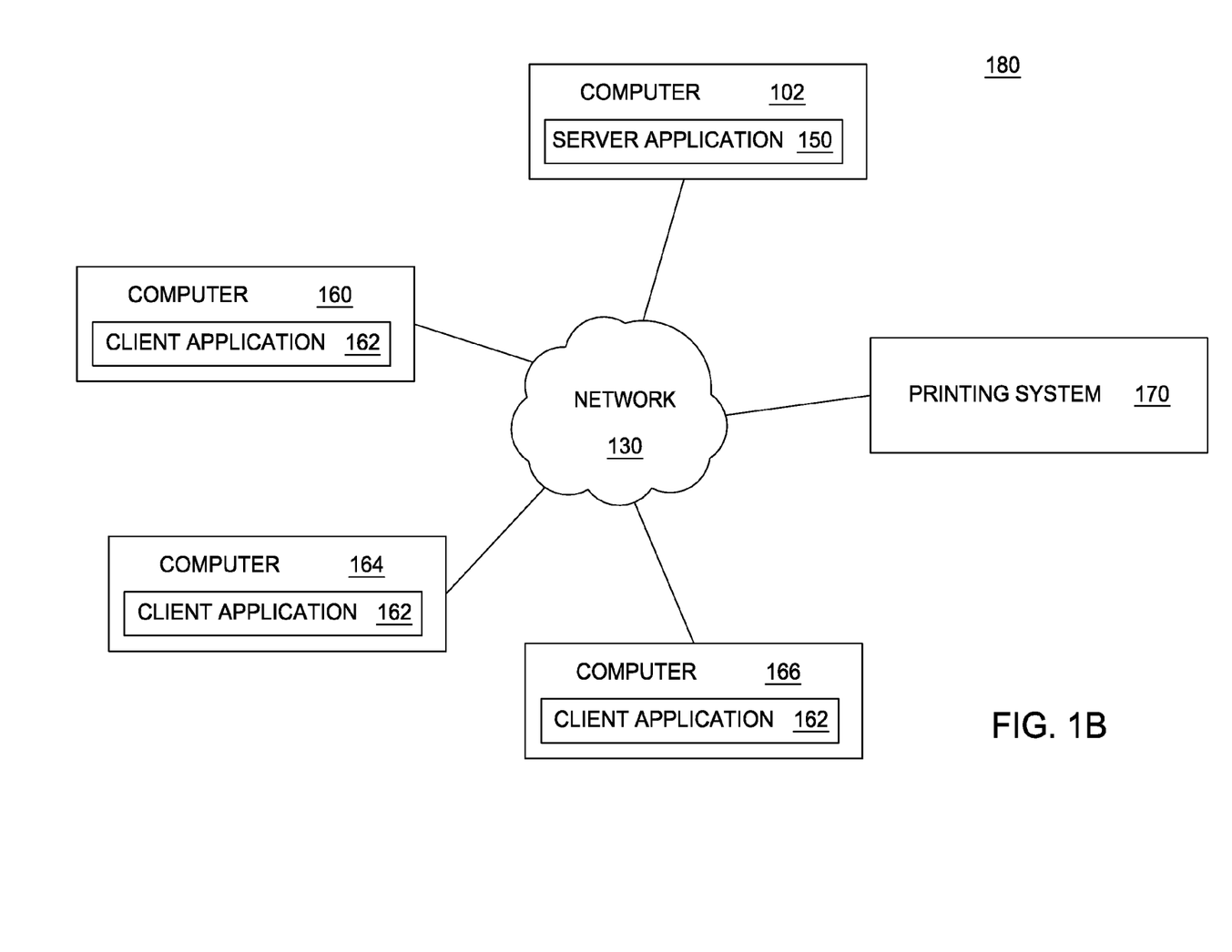

FIG. 1B is a block diagram illustrating a system 180 for managing digital images to be printed, according to one embodiment of the invention. As shown, the system 180 includes computers 102, 160, 164, 166 and a printing system 170, all of which are connected via the network 130. The computer 102 executes a (server) application 150. The computers 160, 164, 166 each execute a client application 162 that communicates with the server application 150 via the network 130. For example, if the server application 150 is a web application, each client application 162 may be a web browser application.

As noted above with respect to FIG. 1, the application 150 may store digital images in a print queue associated with a user of the system for managing digital images (e.g., a user of the computer 160). Further, the application 150 may receive digital images from other users to add to the print queue associated with the user of computer 160. The other users may include a user of the computer 164 and a user of the computer 166. That is, multiple distinct users may send digital images to be added to the print queue for the user of the computer 160. The application 150 may add the digital images to the print queue and evaluate whether the digital images in the print queue satisfy specified printing criteria. If so, the application 150 may transmit the digital images to the printing system 170 to be printed for the user of the computer 160. The application 150 may also notify (e.g., via the client application 162) the user of the computer 160 regarding a printing status of the digital images.

Figure 2:
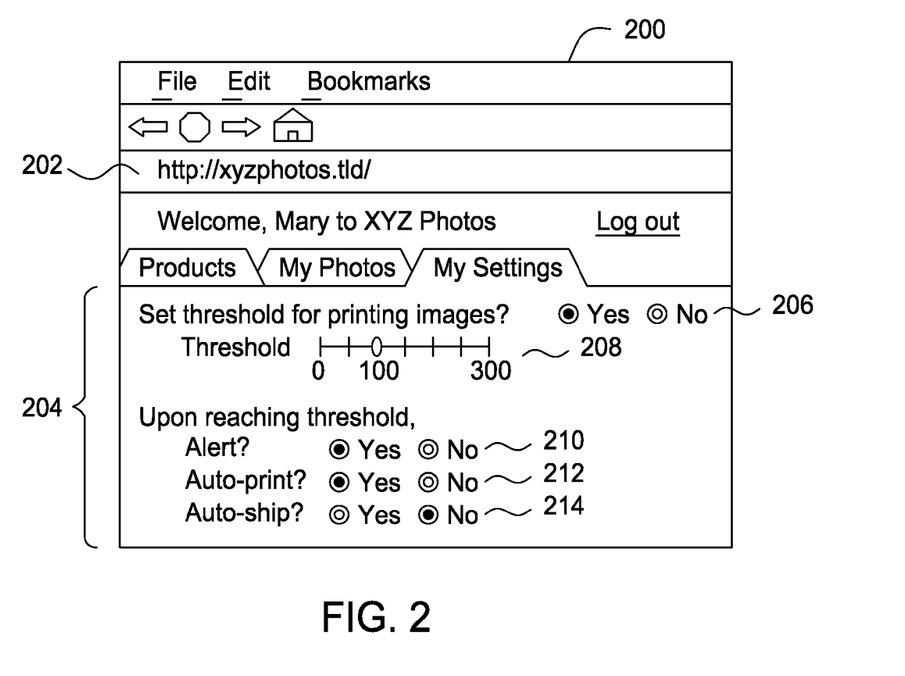
FIG. 2 illustrates a graphical user interface (GUI) screen of an application for managing digital images, according to one embodiment of the invention.

FIG. 2 illustrates a graphical user interface (GUI) screen 200 of the application 150 of FIG. 1A, according to one embodiment of the invention. As shown, the GUI 200 includes a Uniform Resource Identifier 202 and settings 204. As is known, a Uniform Resource Identifier (URI) is a string of characters used to identify or name a resource on a network, such as the Internet. As shown in FIG. 2, "XYZ Photos" is a web application for sharing and/or printing digital images. Further, XYZ Photos is accessible via the URI http://xyzphotos.tld/. Suppose a user, Mary, logs into a user account for Mary provided by XYZ Photos. In one embodiment, the application 150 may present Mary with various settings 204 that Mary may configure.

As shown, the settings 204 include a first setting 206 of whether a threshold is to be applied for printing digital images. The settings 204 also include a second setting 208 of a threshold count for printing digital images. Further, the settings 204 include a third setting 210 specifying whether the application 150 should alert Mary (e.g., via the client application 162) upon detecting that the threshold is reached. The settings 204 also include a fourth setting 212 specifying whether the application 150 should transmit the digital images for printing (e.g., without requiring confirmation from Mary). Still further, the settings 204 include a fifth setting 214 specifying whether printed digital images are to be shipped to Mary (e.g., without requiring confirmation from Mary). Of course, those skilled in the art will recognize that the ways of configuring the application 150 may be tailored to suit the needs of a particular case. Other settings are broadly contemplated without departing from the scope of the invention.

As shown in FIG. 2, Mary has configured the application 150 to apply a threshold count of one hundred digital images. Further, the application 150 should alert Mary when that the threshold count is reached. For example, the application 150 may send Mary an email message, a Short Message Service (SMS) message, etc. Further, the application 150 should transmit the digital images to be printed without requiring confirmation from Mary. In this example, the application 150 should not ship printed digital images to Mary without explicit confirmation. Accordingly, this configuration allows Mary to retrieve at least one hundred images in each trip to the location where the digital images are printed (e.g., the printing system 170 of FIG. 1B).

Figure 3:
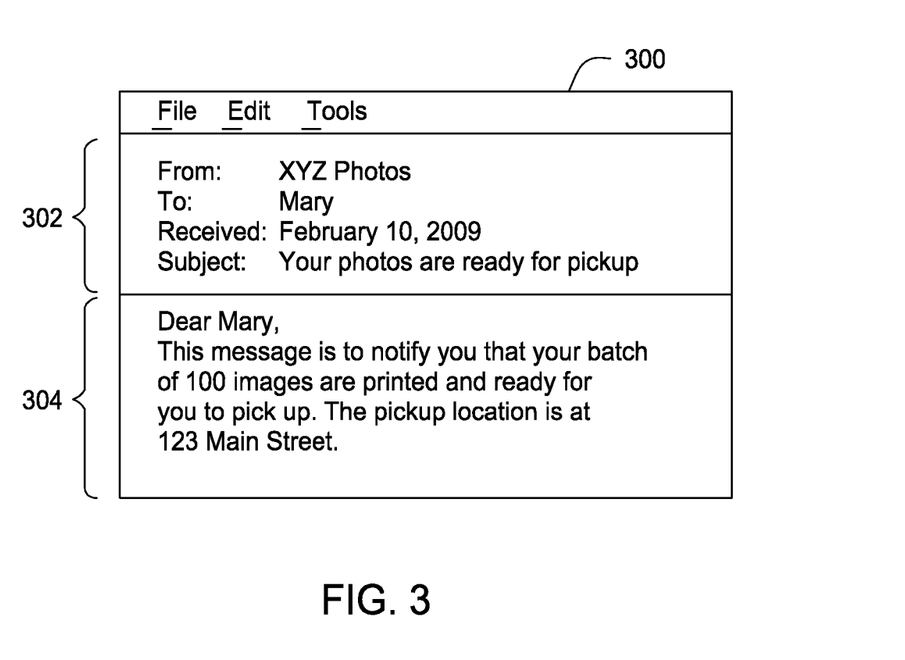
FIG. 3 illustrates an alert message sent by the application, according to one embodiment of the invention.

FIG. 3 illustrates an alert message 300 sent by the application 150 of FIG. 1A, according to one embodiment of the invention. As shown, the alert message 300 includes properties 302 and a message body 304. The properties 302 indicate that the alert message 300 is from XYZ Photos to Mary. Further, the properties 302 indicate that the alert message 300 is received on Feb. 10, 2009. Further still, the properties 302 indicate that a subject of the alert message 300 is "Your photos are ready for pickup." The message body 304 includes, "Dear Mary, This message is to notify you that your batch of 100 images is printed and ready for you to pick up. The pickup location is at 123 Main Street." That is, the application 150 notifies Mary that the digital images are ready for pickup. The application 150 also informs Mary of the pickup location (i.e., "123 Main Street").

Figure 4:
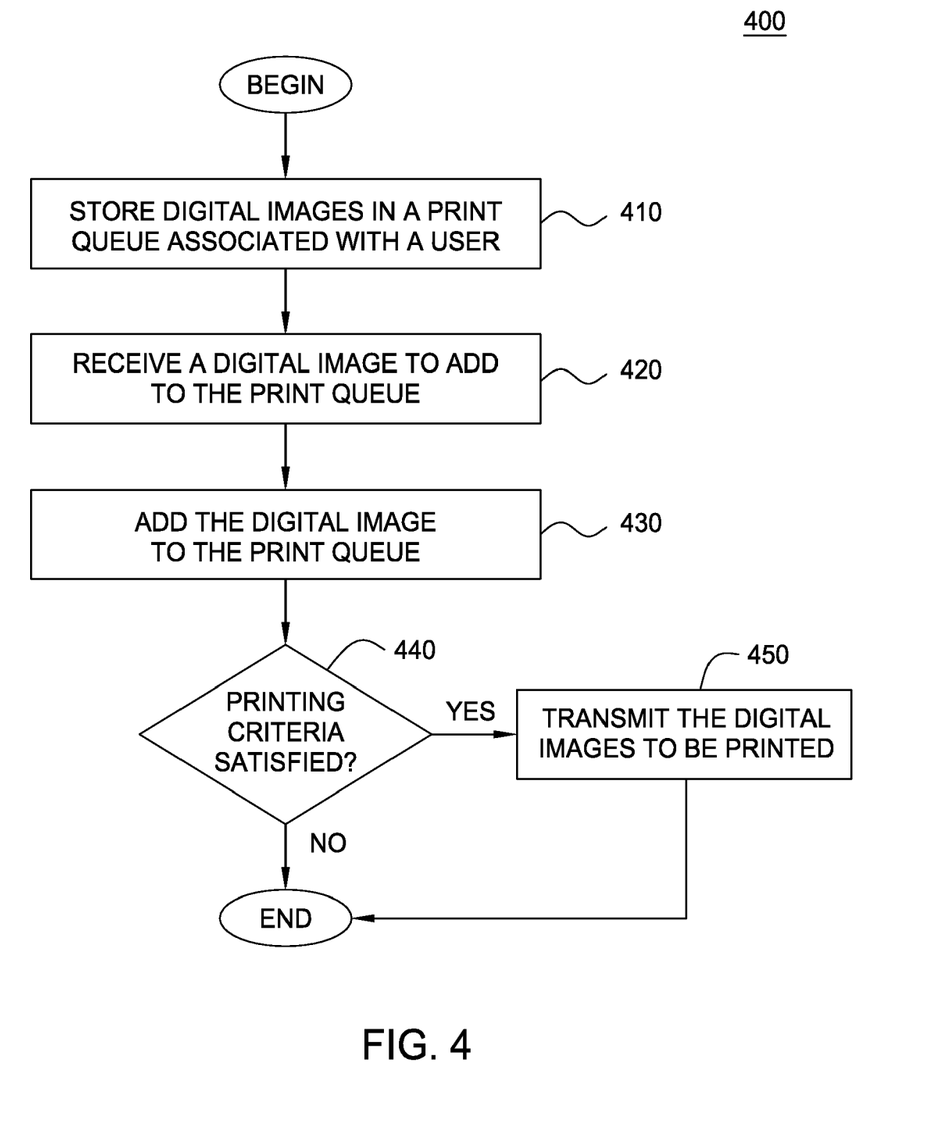
FIG. 4 is a flowchart depicting a method for managing digital images to be printed, according to one embodiment of the invention.

FIG. 4 is a flowchart depicting a method 400 for managing digital images to be printed, according to one embodiment of the invention. As shown, the method 400 begins at step 410, where the application 150 stores digital images in a print queue associated with a user. At step 420, the application 150 receives a digital image to add to the print queue associated with the user. For example, the application 150 may receive, from another user, a digital image to share with the user. At step 430, the application 150 adds the digital image to the print queue associated with the user. At step 440, the application 150 determines whether the digital images in the print queue satisfy printing criteria (e.g., a threshold count of digital images specified by the user or set by the application 150 my default). If so, the application 150 may transmit the digital images to a printing system be printed for the user (step 450). Otherwise, the method 400 terminates.

In one embodiment, the application 150 determines the threshold count of digital images (e.g., based on a travel distance between the user and a pickup location). For example, the application 150 may determine a travel distance between the user and a pickup location nearest to the user (or a pickup location specified by the user) via a third-party web service. The user may also configure the threshold, according to one embodiment. Further, the application 150 may also prune digital images from the print queue based on input from the user.

Figure 5:
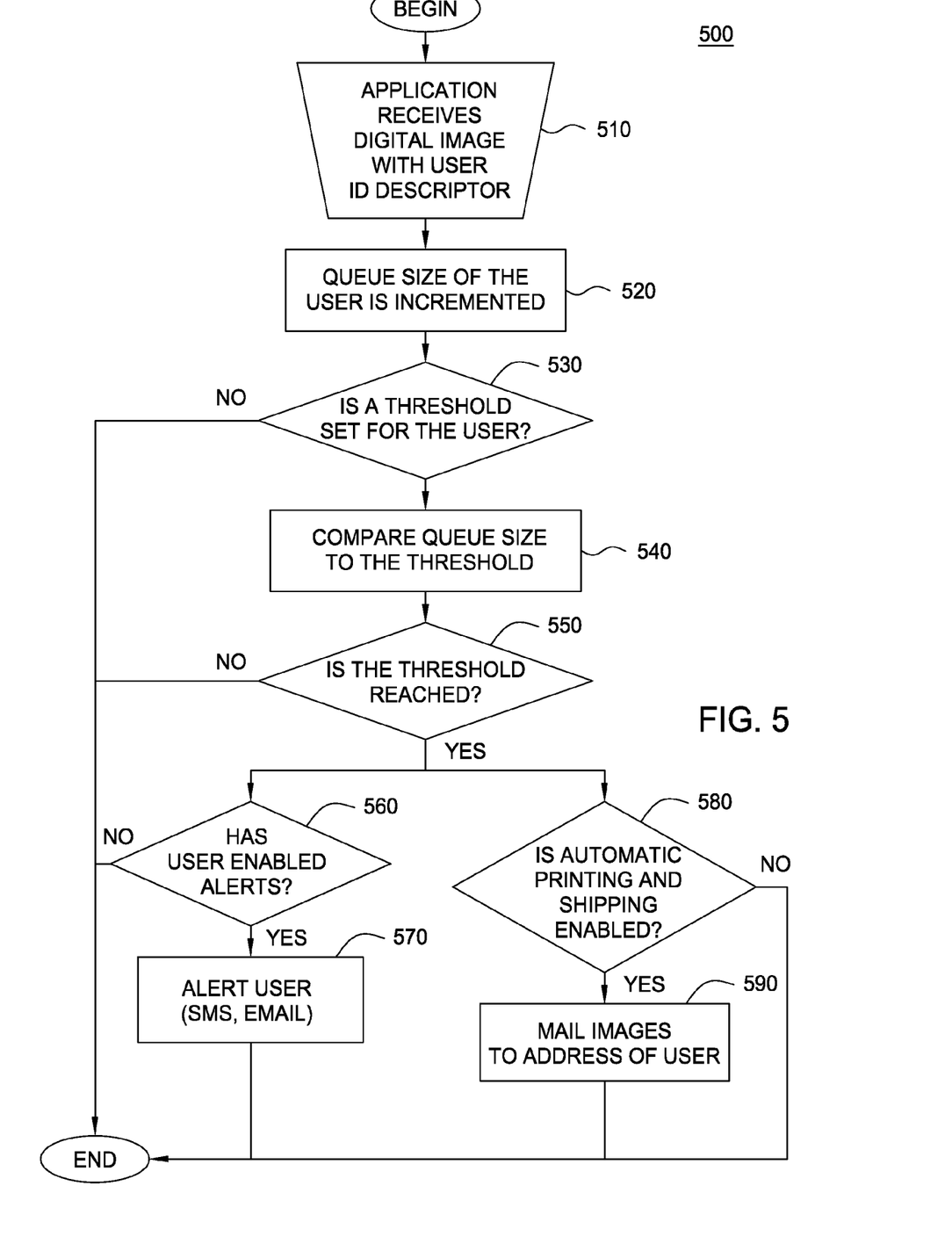
FIG. 5 is a flowchart depicting another method for managing digital images to be printed, according to one embodiment of the invention.

FIG. 5 is a flowchart depicting a method 500 for managing digital images to be printed, according to one embodiment of the invention. The method 500 corresponds to the steps 420 through 450 of FIG. 4. As shown, the method 500 begins at step 510, where the application 150 receives a digital image. The digital image may also include a descriptor that identifies a user. At step 520, the application 150 adds the digital image to a queue for the identified user. At step 530, the application 150 determines whether a threshold is set for the user. If no threshold is set, the method 500 terminates.

However, if a threshold is set for the user (step 530), the method 500 proceeds to step 540, where the application compares a size of the queue to the threshold. The application then determines whether the size of the queue reaches the threshold (step 550). If the size of the queue does not reach the threshold, the method 500 terminates.

However, if the size of the queue reaches the threshold (step 550), the application 150 may proceed to steps 560 and 580. For example, the application may determine whether alerts are enabled for the user (step 560). If so, the application 150 alerts the user (step 570). Further, the application may determine whether automatic printing and shipping is enabled for the user (step 580). If so, the application 150 specifies the digital images to be printed and mailed to an address of the user (step 590). After the steps 570 and/or 590, the method 500 terminates.

Other embodiments are broadly contemplated without departing from the scope of the invention. For example, upon detecting that the threshold is reached, the application 150 may request the user to confirm that the digital images are to be printed. The user may review the digital images and specify that one or more of the digital images are not to be printed. For example, the user may specify that ten of the one hundred images are not to be printed. The user may request the application 150 to proceed with transmitting the ninety images to be printed. Alternatively, the user may request that the ninety images are to remain in the queue until at least ten more images are received (i.e., to reach the threshold once again).

Further, the user may also specify that digital images received from a particular sender are to be separately transmitted for printing (relative to digital images received from other senders), according to one embodiment. For example, Mary may specify that digital images shared by John are to be printed immediately rather than queued with digital images shared by users other than John. Of course, those skilled in the art will recognize that the way of managing digital images to be printed based on senders of the digital images may be tailored to suit the needs of a particular case. For example, Mary may specify that digital images from John are twice as important as digital images from users other than John. Consequently, the application may count a single digital image shared by John as two digital images for the purposes of the threshold for Mary.

Further still, the user may specify that the application 150 is to transmit digital images for printing upon determining that an event (such as a retail promotion) is taking place. For example, suppose that sixty digital images are pending in a queue for Mary. Suppose also that Mary has specified a threshold of one hundred digital images. If the application 150 detects that a promotion is being held that provides twenty free digital image prints on orders of fifty or more digital image prints, the application 150 may transmit the sixty digital images to be printed for Mary, thus benefiting Mary from the promotion (despite the threshold of one hundred digital images not yet being reached). Of course, those skilled in the art will recognize that the way of managing digital images to be printed based on an event occurring may be tailored to suit the needs of a particular case. For example, the application 150 may take into account shipping costs. If a retail promotion offers a $3.00 flat fee for shipping, the application 150 may transmit a number of digital images greater than the threshold of one hundred digital images, to take further advantage of the flat fee shipping.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide techniques for managing a collection of digital images store for a user in a printing queue. In one embodiment, a web-based application stores the collection of digital images in the queue associated with the first user. As the first user (or other users) add images to the queue, and as the first user prunes images from the queues, the web-based application may determine whether any printing criteria specified for the print queue have been satisfied. For example, the application may determine that a count of the digital images exceeds a threshold count. Once the application determines that the printing criteria have been satisfied, the application may transmit the digital images to be printed. However, in one embodiment, the application may prompt the user prior to sending the digital images to be printed. In such a case, the user may confirm whether the images should be printed, change the criteria for their print queue, and add (or remove) images from the queue. Similarly, the user may specify any printing options (e.g., how many copies of each image to print, or whether to ship the images to the user or hold for pick-up or even the particular location at which the user will pick up the printed images).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
configuring one or more computer processors to perform an operation comprising:
storing digital images in a print queue associated with a first user;
receiving, from a second user, a first digital image to share with the first user;

adding the first digital image to the print queue associated with the first user;

determining that the digital images in the print queue satisfy one or more printing criterions including at least a threshold count of digital images received for the first user, wherein the threshold count is based at least in part on a travel distance from a location of the first user to a location for picking up printed copies of the digital images; and transmitting the digital images to an image printing system.

2. The computer-implemented method of claim 1, wherein the operation further comprises:

pruning at least one digital image from the print queue based on input from the first user.

3. The computer-implemented method of claim 1, wherein the operation further comprises:

notifying the first user that the digital images are ready to be picked up by the first user.

4. The computer-implemented method of claim 1, wherein the operation further comprises:

setting the one or more printing criterions based on input from the first user.

5. The computer-implemented method of claim 1, wherein the operation further comprises:

prompting the first user to confirm to print the digital images in the print queue.

6. The computer-implemented method of claim 1, wherein at least one of the digital images received for the first user includes a descriptor identifying the first user.

7. The computer-implemented method of claim 1, wherein the operation further comprises:

determining the threshold count of digital images received for the first user.

8. A computer-readable storage medium containing a program, which, when executed on a processor, performs an operation comprising:

storing digital images in a print queue associated with a first user;

receiving, from a second user, a first digital image to share with the first user;

adding the first digital image to the print queue associated with the first user;

determining that the digital images in the print queue satisfy one or more printing criterions including at least a threshold count of digital images received for the first user, wherein the threshold count is based at least in part on a travel distance from a location of the first user to a location for picking up printed copies of the digital images; and transmitting the digital images to an image printing system.

9. The computer-readable storage medium of claim 8, wherein the operation further comprises:

pruning at least one digital image from the print queue based on input from the first user.

10. The computer-readable storage medium of claim 8, wherein the operation further comprises:

notifying the first user that the digital images are ready to be picked up by the first user.

11. The computer-readable storage medium of claim 8, wherein the operation further comprises:

setting the one or more printing criterions based on input from the first user.

12. The computer-readable storage medium of claim 8, wherein the operation further comprises:

prompting the first user to confirm to print the digital images in the print queue.

13. The computer-readable storage medium of claim 8, wherein at least one of the digital images received for the first user includes a descriptor identifying the first user.

14. The computer-readable storage medium of claim 8, wherein the operation further comprises:

determining the threshold count of digital images received for the first user.

15. A system, comprising:

one or more computer processors; and a memory containing a program, which when executed by the one or more computer processors is configured to perform an operation comprising:

storing digital images in a print queue associated with a first user;

receiving, from a second user, a first digital image to share with the first user;

adding the first digital image to the print queue associated with the first user;

determining that the digital images in the print queue satisfy one or more printing criterions including at least a threshold count of digital images received for the first user, wherein the threshold count is based at least in part on a travel distance from a location of the first user to a location for picking up printed copies of the digital images; and transmitting the digital images to an image printing system.

16. The system of claim 15, wherein the operation further comprises:

pruning at least one digital image from the print queue based on input from the first user.

17. The system of claim 15, wherein the operation further comprises:

notifying the first user that the digital images are ready to be picked up by the first user.

18. The system of claim 15, wherein the operation further comprises:

setting the one or more printing criterions based on input from the first user.

19. The system of claim 15, wherein the operation further comprises:

prompting the first user to confirm to print the digital images in the print queue.

20. The system of claim 15, wherein at least one of the digital images received for the first user includes a descriptor identifying the first user.

21. The system of claim 15, wherein the operation further comprises:

determining the threshold count of digital images received for the first user.

* * * * *